US012250521B2

(12) United States Patent
Wilson et al.

(10) Patent No.: US 12,250,521 B2
(45) Date of Patent: Mar. 11, 2025

(54) METHOD FOR OPERATING A HEARING INSTRUMENT AND HEARING INSTRUMENT

(71) Applicant: Sivantos Pte. Ltd., Singapore (SG)

(72) Inventors: Cecil Wilson, Erlangen (DE); Matthias Müller-Wehlau, Erlangen (DE)

(73) Assignee: Sivantos Ptd. Ltd., Singapore (SG)

( * ) Notice: Subject to any disclaimer, the term of this patent is extended or adjusted under 35 U.S.C. 154(b) by 0 days.

(21) Appl. No.: 18/422,253

(22) Filed: Jan. 25, 2024

(65) Prior Publication Data

US 2024/0251209 A1 Jul. 25, 2024

(30) Foreign Application Priority Data

Jan. 25, 2023 (DE) ..................... 10 2023 200 581.6

(51) Int. Cl.
*H04R 25/00* (2006.01)

(52) U.S. Cl.
CPC ......... *H04R 25/505* (2013.01); *H04R 25/405* (2013.01); *H04R 25/407* (2013.01); *H04R 2225/39* (2013.01); *H04R 2225/43* (2013.01); *H04R 2430/01* (2013.01)

(58) Field of Classification Search
CPC .. H04R 25/505; H04R 25/405; H04R 25/407; H04R 2225/39; H04R 2225/43; H04R 2430/01
See application file for complete search history.

(56) References Cited

U.S. PATENT DOCUMENTS 6,885,752 B1 4/2005 Chabries et al.
10,142,741 B2 11/2018 Aubreville et al.
10,991,378 B2 4/2021 Rosenkranz
2008/0267416 A1* 10/2008 Goldstein ................ H04R 3/00 381/56
2015/0156592 A1* 6/2015 Jensen ................. H04R 25/407 381/23.1
2015/0341730 A1 11/2015 Pedersen et al.
2021/0168534 A1* 6/2021 Mowlaee ............. H04R 25/505

FOREIGN PATENT DOCUMENTS

DE 60037034 T2 8/2008
DE 102016200637 B3 4/2017
EP 3565270 A1 11/2019

* cited by examiner

*Primary Examiner* — Suhan Ni
(74) *Attorney, Agent, or Firm* — Laurence A. Greenberg; Werner H. Stemer; Ralph E. Locher

(57) ABSTRACT

A method operates a hearing instrument having an acousto-electric first input transducer and an electro-acoustic output transducer. A first input signal is generated by the first input transducer from an ambient sound. The first input signal and/or a first intermediate signal derived from the first input signal is resolved into a multiplicity of frequency bands. An output signal is generated from the first input signal, or from the first intermediate signal, by frequency-selective signal processing. A relevant subset of frequency bands is determined from the aforementioned multiplicity such that, in each frequency band of the relevant subset, an output sound generated from the output signal by the output transducer makes a contribution that lies above a predefined or desired threshold, further, with the aid of signal components of the first input signal, or of the first intermediate signal.

12 Claims, 2 Drawing Sheets

METHOD FOR OPERATING A HEARING INSTRUMENT AND HEARING INSTRUMENT

CROSS-REFERENCE TO RELATED APPLICATION

This application claims the priority, under 35 U.S.C. § 119, of German Patent Application DE 10 2023 200 581.6, filed Jan. 25, 2023; the prior application is herewith incorporated by reference in its entirety.

FIELD AND BACKGROUND OF THE INVENTION

The invention relates to a method for operating a hearing instrument which has at least one acousto-electric first input transducer and an electro-acoustic output transducer. The a first input signal is generated by the first input transducer from an ambient sound, and the first input signal and/or a first intermediate signal derived from the first input signal is resolved into a multiplicity of frequency bands. An output signal is generated from the first input signal, or from the first intermediate signal, by means of frequency-selective signal processing.

A hearing instrument generally refers to an electronic apparatus which assists the hearing of a person wearing the hearing instrument (who is referred to below as the "wearer" or "user"). In particular, the invention relates to hearing instruments which are adapted to compensate fully or partially for a hearing loss of an aurally impaired user. Such a hearing instrument is also referred to as a "hearing aid". Besides this, there are hearing instruments which are intended to protect or improve the hearing of users who have normal hearing, for example to enable improved speech intelligibility in complex listening situations, or also in the form of communication apparatuses (for instance headsets and the like, optionally with earbud-like headphones).

Hearing instruments in general, and hearing aids in particular, are usually configured to be worn on the head, and in this case particularly in or on an ear of the user, in particular as behind-the-ear apparatuses (also referred to as BTE apparatuses) or in-the-ear apparatuses (also referred to as ITE apparatuses). In respect of their internal structure, hearing instruments regularly have at least one (acousto-electric) input transducer, a signal processing device (signal processor) and an output transducer. During operation of the hearing instrument, the or each input transducer receives an ambient sound and converts this ambient sound into a corresponding electrical input signal. In the signal processing device, the or each input signal is processed (i.e. modified in respect of its sound information), particularly in order to assist the hearing of the user, that is to say particularly preferentially to compensate for a hearing loss of the user. The signal processing device outputs a correspondingly processed audio signal as an output signal to the output transducer, which converts the output signal into an output sound signal. The output sound signal may in this case consist of a sound wave which is emitted into the auditory canal of the user (optionally via a sound tube, as in the case of a BTE apparatus, or by a corresponding positioning of the hearing instrument in the auditory canal). The output sound signal may also be emitted into the cranial bone of the user.

Many subalgorithms in the scope of the aforementioned signal processing, for example noise suppression or directional microphony (the latter in conjunction with a second input signal of the hearing instrument) are in this case applied to the first input signal as a function of an activation criterion: if the activation criterion is satisfied, which per se in turn involves verifying particular features of signal components of the first input signal, the subalgorithm in question is correspondingly applied.

Attempts are in this case often made to use the signal processing as conservatively as possible in the scope of the audiological requirements of the user. This is important particularly against the background, since the signal processing often leads to a realistic aural impression being degraded, for example in the case of spatial hearing, or by artefacts which may result from the signal processing.

SUMMARY OF THE INVENTION

It is therefore an object of the invention to improve the control of the application of signal processing to an input signal of a hearing instrument.

The aforementioned object is achieved according to the invention by a method for operating a hearing instrument which has at least one acousto-electric first input transducer and an electro-acoustic output transducer. A first input signal is generated by the first input transducer from an ambient sound and the first input signal and/or a first intermediate signal derived from the first input signal is resolved into a multiplicity of frequency bands. An output signal is generated from the first input signal, or from the first intermediate signal, by means of frequency-selective signal processing.

According to the method, a relevant subset of frequency bands is determined from the aforementioned multiplicity in such a way that, in each frequency band of the relevant subset, an output sound generated from the output signal by the output transducer makes a contribution that lies above a predefined and/or desired threshold, further, with the aid of signal components of the first input signal, or of the first intermediate signal, an activation criterion for activation of a subalgorithm for the aforementioned signal processing is verified only in the frequency bands of the relevant subset, and the aforementioned subalgorithm is applied to the first input signal, or to the first intermediate signal, as a function of the activation criterion. Advantageous embodiments, some of which are inventive per se, are the subject of the dependent claims and the following description.

As described in the introduction, the hearing instrument may be adapted to assist the hearing of a user and may in particular be configured as a hearing aid "in the narrower sense" (that is to say for alleviating a hearing impairment).

An acousto-electric input transducer in this case means, in particular, any appliance which is adapted to generate a corresponding electrical signal from a sound signal. In particular, preprocessing may also be carried out during the generation of the first or second input signal by the respective input transducer, for example in the form of linear preamplification and/or A/D conversion. During operation of the hearing instrument, the or each input transducer receives an ambient sound and converts this ambient sound into a corresponding electrical signal, the current and/or voltage variations of which preferentially carry information relating to the oscillations of the air pressure that are caused by the ambient sound in the air.

An electro-acoustic output transducer in this case means any appliance which is intended and adapted to convert an electrical signal into a corresponding sound signal, voltage and/or current variations in the electrical signal being converted into corresponding amplitude variations of the sound signal, that is to say in particular a loudspeaker, a so-called balanced metal case receiver, or alternatively bone conduction headphones.

The term "a first intermediate signal derived from the first input signal" in this case preferentially means that the signal components of the first input signal are incorporated directly into the first intermediate signal, and therefore in particular the first input signal is not used merely for generating control parameters or the like, which are applied to signal components of other signals.

The first input signal (or the aforementioned first intermediate signal) is then resolved into a multiplicity of frequency bands, preferentially by means of a corresponding analysis filter bank, in order to process the signals of the first input signal (or of the first intermediate signal) frequency band-specifically, preferentially as a function of the audiological requirements of the user. By means of this frequency-selective processing of the signal components of the first input signal, or intermediate signal, an output signal is then generated which is converted by the output transducer into an output sound, the voltage variations of the output signal preferentially being converted into corresponding air pressure oscillations in the output sound.

From the multiplicity of frequency bands that have been generated for the frequency-selective signal processing, a relevant subset is then determined. This relevant subset of frequency bands is distinguished in that the contributions existing in these frequency bands in the output sound that is generated by the output transducer from the output signal lie above a desired or predefinable threshold (for instance a minimum level in dB or the like). In other words, the frequency bands selected as a relevant subset are those in which the frequency-selective signal processing actually leads to relevant contributions in the output sound since, depending on the adjustment of the hearing instrument or depending on the respective algorithm in a given listening situation, particular frequency bands, especially at one of the edges (or both edges) of the transmitted frequency spectrum, experience no significant (that is to say in particular no perceptible) amplification.

The relevant subset may in this case, in particular, be ascertained statistically as a function of knowledge about the signal amplifications in the individual frequency bands. Preferentially, an adjustment formula of frequency band-based adjustment of the hearing instrument is employed in order to determine the relevant subset. In particular, for "open adjustment" with a hearing instrument having a large ventilation channel (vent), which may for instance be provided in order to avoid occlusion in the housing of the hearing instrument and connects the region of the auditory canal that is closed by the hearing instrument to the free external region, the signal amplification of low frequency bands from 0 Hz up to 500 Hz, preferentially up to 1000 Hz, particularly preferentially up to 1500 Hz, may be suspended or substantially suspended (that is to say being for instance in principle preferentially at least 10 dB, particularly preferentially at least 20 dB, less in relation to the most strongly amplified bands).

The relevant subset of frequency bands is then used to verify an activation criterion for activation of a subalgorithm of the aforementioned signal processing only, or at most, in the frequency bands of the relevant subset, and in particular not to carry out such verification in those frequency bands which do not belong to the relevant subset. The subalgorithm is then applied as a function of the activation criterion to the first input signal, or to the first intermediate signal derived therefrom.

In this way, it is possible to prevent a subalgorithm of the signal processing, which preferentially contains frequency band-based amplification and/or frequency band-based compression, from being dynamically activated with the aid of sound events that ultimately make no contribution to the output sound generated by the hearing instrument.

For example, if there is significant noise interference (for example a low-frequency hum) outside the relevant frequency bands (i.e. the frequency bands of the relevant subset), which is therefore not transmitted at all (or not transmitted to an audible extent) by the hearing instrument, a noise suppression algorithm is not activated by the described method since it could not, or could not satisfactorily, correct the hum in view of the lack of signal amplification in the frequency range of the hum, but could possibly entail other problems (for example artefacts) that cannot then be avoided. Only if such noise interference lies in the frequency bands of the relevant subset (and is thus also transmitted sufficiently by the hearing instrument, and can therefore actually be corrected significantly) is a subalgorithm for corresponding noise suppression preferentially activated.

Preferentially, in order to determine the relevant subset on a frequency band basis, alternatively or in addition a gain value of signal contributions of the first input signal, or of the first intermediate signal, in the respective frequency band is ascertained. The relevant subset is then preferentially formed by those frequency bands for which the gain value exceeds a predefined limit value, which is preferentially to be selected as a function of the aforementioned threshold for the contribution in the output sound.

Advantageously, for this purpose, in order to determine the gain value on a frequency band basis, the first input signal is compared with the output signal and/or a signal amplification applied along a signal path from the first input transducer to the output transducer is monitored, the gain value thus being compared with a first limit value dependent on the aforementioned threshold. In other words, the signal amplification which "accumulates" along the entire signal path from the first input transducer to the output transducer is monitored for each frequency band, and this cumulative signal amplification of all the subalgorithms of the signal processing in the frequency band is compared with the first limit value, which represents the relevant contribution in the output sound in terms of the signal amplification.

Expediently, in order to determine the relevant subset, a setting of a signal amplification performed by a user of the hearing instrument is taken into account. This may in particular, be carried out by a signal amplification accumulated along the entire signal path being instantaneously corrected by the value of a setting made by the user.

In one advantageous configuration, in order to verify the activation criterion, a characteristic quantity which provides inference about a noise component in the frequency bands is ascertained from the signal components of the first input signal, or of the first intermediate signal, in the aforementioned frequency bands of the relevant subset. In other words, this means that an estimate of the noise component in the "relevant" frequency bands of the relevant subset is made by means of the characteristic quantity. Favorably, in this case the aforementioned characteristic quantity is compared with a noise limit value which corresponds to an upper limit for a permissible noise component in the aforementioned frequency bands, the activation criterion for the activation of the subalgorithm being considered to be satisfied if the noise limit value is exceeded.

In particular, in the event that a high noise component in the relevant frequency bands is inferred, a subalgorithm for noise suppression is activated with the aid of the characteristic quantity. Preferentially, a signal-to-noise ratio (SNR) of the signal components in the frequency bands of the relevant subset is in this case ascertained as the characteristic quantity. This may be carried out by means of estimates of a noise component and optionally of a useful signal component, and these may be determined for instance from a medium-term statistical behavior (for example over a plurality of frames or a plurality of tens of frames) of the respective signal components.

In a further advantageous configuration, a second input signal is generated by an acousto-electric second input transducer of the hearing instrument from the ambient sound, the output signal additionally being generated from frequency-selective signal processing of the second input signal, and the subalgorithm comprising directional microphony of the first input signal, or of the first intermediate signal, and of the second input signal and/or of a second intermediate signal derived from the second input signal. In particular, this involves the activation criterion being used to activate directional noise suppression. Many hearing instruments, in particular hearing aids for alleviating a hearing impairment, often have more than one input transducer in order to allow directional signal processing. In the aforementioned advantageous configuration of the invention, this directional signal processing is activated in the manner described as a function of the activation criterion in the relevant frequency bands.

Preferentially the activation algorithm is in this case also verified with the aid of signal components of the second input signal, or of the second intermediate signal, only in the frequency bands of the relevant subset. In particular, this involves for instance a provisional directional signal, the signal components of which in the relevant frequency bands may be verified against the activation criterion, being formed from the first and second input signals. If the activation criterion is satisfied (that is to say a decision is made to activate the subalgorithm), in the case of directional microphony as the subalgorithm to be activated, the directional signal may be processed further to form the output signal directly.

The invention further provides a hearing instrument comprising at least one acousto-electric first input transducer, an electro-acoustic output transducer and a signal processing device, wherein the hearing instrument is adapted to carry out the method as described above.

The hearing instrument according to the invention shares the benefits of the method according to the invention. The advantages mentioned for the method and its developments may be attributed accordingly to the hearing instrument.

Other features which are considered as characteristic for the invention are set forth in the appended claims.

Although the invention is illustrated and described herein as embodied in a method for operating a hearing instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and quantities which correspond to one another are respectively provided with the same reference signs in all the figures.

Figure 1:
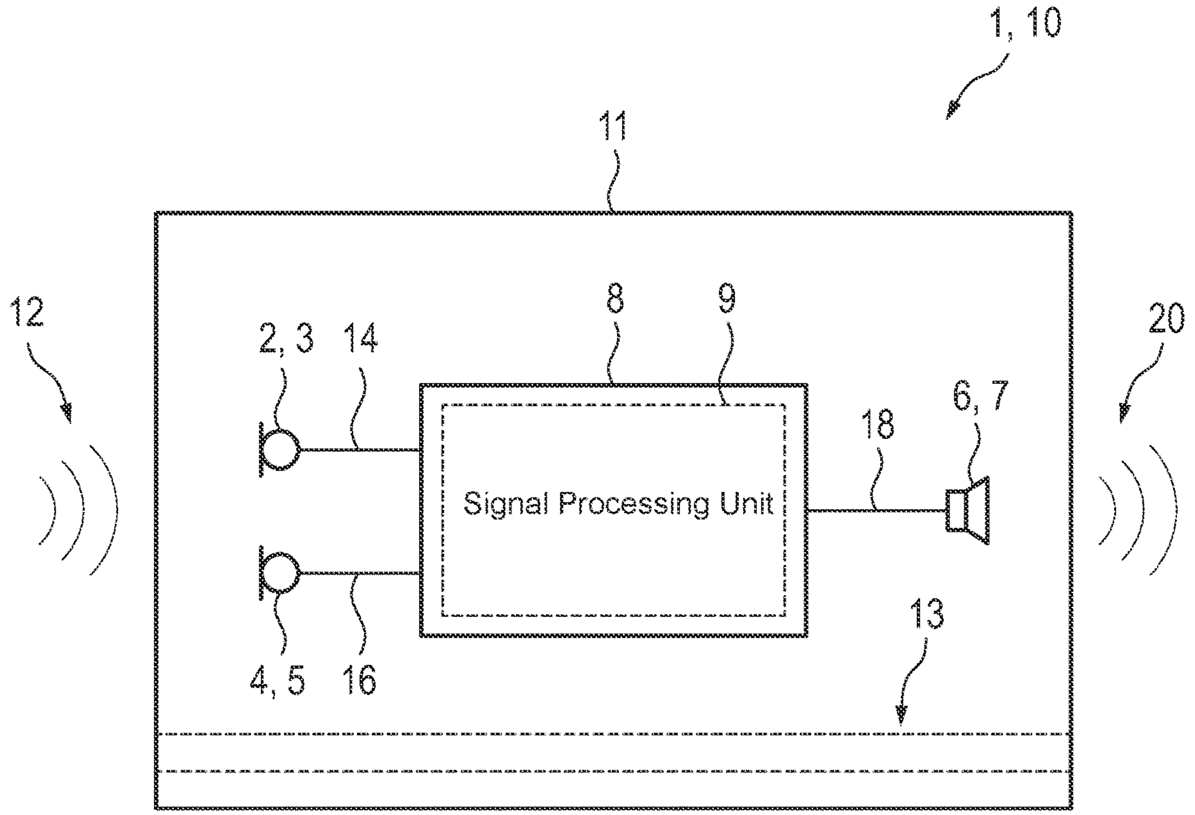
FIG. 1 is a block diagram of a hearing instrument with frequency band-based signal processing.

Referring now to the figures of the drawings in detail and first, particularly to FIG. 1 thereof, there is shown schematically a block diagram of a hearing instrument 1, which has an acousto-electric first input transducer 2 and an acousto-electric second input transducer 4 as well as an electro-acoustic output transducer 6 and a signal processing device 8. The first input transducer 2 and the second input transducer 4 are in the present case configured respectively as a first and second microphone 3, 5. The output transducer 6 is configured as a loudspeaker 7. The signal processing device 8 has at least one signal processor 9 (indicated by dashes). The hearing instrument 1 is in the present case configured as a hearing aid 10, which is adapted to alleviate, that is to say at least partially compensate for or correct, a hearing impairment of a user (not represented in detail).

For this purpose, a first input signal 14 is generated by the first microphone 3 and a second input signal 16 is generated by the second microphone 5 from an ambient sound 12. The first input signal 14 and the second input signal 16 are further processed together in the signal processing unit 8 to form an output signal 18, while in particular being amplified frequency band-specifically. The output signal 18 is converted by the loudspeaker 7 into an output sound 20, which is emitted or guided into an auditory canal (not represented) of the user. A ventilation channel 13 (a so-called vent; indicated by dashes) is furthermore accommodated in a housing 11 of the hearing aid 10. This vent is intended to ensure better pressure equilibration in view of the substantial closure of the auditory canal by the housing 11.

The signal processing of the first and second input signals 14, 16 to form the output signal 18, which takes place in the signal processing device 8, is in this case on the one hand, as already mentioned, carried out as a function of the audiological requirements of the user, so that for example important frequency bands in which a hearing loss of the user is particularly pronounced are in general usually amplified more than those frequency ranges in which the hearing loss is only minor. On the other hand, specific subalgorithms of the signal processing, for example noise suppression or directional microphony, that is to say the formation of a directional signal from the first and second input signals 14, 16, are employed in a dependency yet to be described on specific acoustic features in the ambient sound 12. This means, in particular, that a subalgorithm in question is applied only if the features deemed necessary for the application are present to a sufficient extent in the ambient sound 12.

Figure 2:
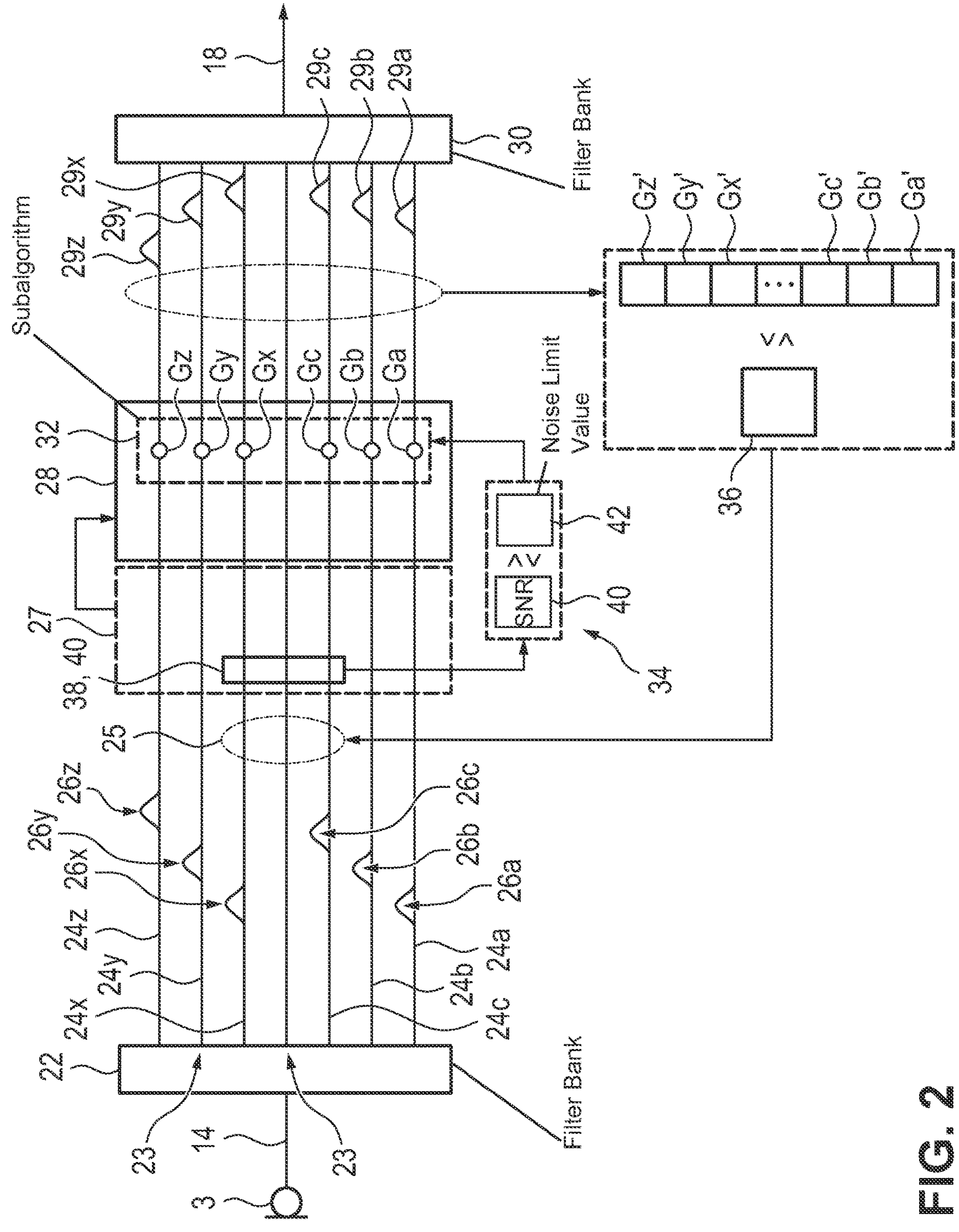
FIG. 2 is a block diagram of frequency-selective activation of a subalgorithm of the signal processing according to FIG. 1.

This relationship between the features of the ambient sound 12 and the application of a subalgorithm of the signal processing in the signal processing device 8 will now be illustrated with the aid of FIG. 2. FIG. 2 schematically represents a block diagram of a method, with the aid of which an application of a subalgorithm in the signal processing of the hearing aid 10 according to FIG. 1 is controlled. It should be noted that the hearing aid 10 is provided in the present case by a so-called ITE (in-the-ear) apparatus. It could, however, equally well be configured as a BTE (behind-the-ear) apparatus, a CIC (completely-in-the-canal) apparatus or an RIC (receiver-in-canal) apparatus.

The first input signal 14, generated by the first microphone 3, is resolved in the signal processing device 8 by a first analysis filter bank 22 into a multiplicity 23 of frequency bands 24*a-z*. Corresponding signal components 26*a-z* of the first input signal 14 are then subjected in the signal processing device 8 to an analysis 27 and, as a function of the analysis 27, to the respectively intended signal processing 28. The signal components 26*a-z* are in this case, inter alia, amplified frequency-dependently by the application of corresponding gain factors Ga-Gz, and furthermore also compressed frequency band-dependently (i.e. the gain factors Ga-Gz are adjusted almost instantaneously as a function of the dynamic range of the signal components 26*a-z*). The processed signal components 29*a-z* resulting from the signal processing 28 are combined by a first synthesis filter bank 30 to form the output signal 18.

The signal processing 28 in this case uses in particular a subalgorithm 32 which, for example, may be given by the already described frequency band-dependent amplification by means of the gain factors Ga-Gz, noise suppression, or directional microphony with signal components of the second input signal 16, in which case this directional microphony may also be used as directional noise suppression. The subalgorithm 32 should in this case, however, be used as a function of the acoustic situation contained in the first input signal 14 only in those situations, in particular listening situations, in which an improvement of the hearing or auditory sensation to be expected for the user of the hearing aid 10 is as a result of its application to the corresponding signal components 26*a-z*.

This means in particular that for example noise suppression is not applied permanently, since noise suppression algorithms may for example generate undesired artefacts in the output signal, but only when this appears sensible in view of the acoustic information that is contained in the first input signal 14 relating to the ambient situation (that is to say a noisy environment rich in noise interference is assumed or identified). Likewise, for instance, directional processing of the first and second input signals 14, 16 in order to form a directional signal, or amplification of a directional effect of such a directional signal, is applied only if this appears sensible in view of the acoustic analysis of the first (and optionally second) input signal 14 (or 16) since directional microphony is in principle capable of perturbing the spatial auditory sensation, so that for instance it might no longer be possible to localize sound sources correctly.

For this reason, in a manner yet to be described for an application of the subalgorithm 32 of the signal processing 28, an activation criterion 34 is verified, which is intended to ensure that when applying the subalgorithm 32 in the respectively existing ambient situation with its acoustic occurrences, the advantages of the application outweigh possible disadvantages (for instance those mentioned above) for the user, including and particularly considering their individual audiological requirements.

Here, however, it is the case that in certain of the frequency bands 24*a-z*, the signal processing is such that they make no significant contributions in the output signal 18. This may for example, be because for a particularly large ventilation channel 13, a large proportion of direct sound in lower frequency bands enters the auditory canal through the aforementioned ventilation channel 13 (and therefore reaches the eardrum), and amplified signal components in the lower frequency bands are therefore superimposed on the aforementioned direct sound, which could under certain circumstances possibly lead to undesired comb filter effects. Often, no significant amplification of the signal contributions in question takes place even above 8 kHz or 10 kHz, since the frequency bands in question generally no longer have any relevance for speech intelligibility.

The activation criterion 34 could therefore possibly evaluate signal components 26*a-z* of the first input signal 14 whose correspondences in the output sound 20 make no significant contribution (that is to say in particular no contribution which is readily perceptible for the user) to an overall sound (not represented) which reaches the eardrum (not represented). The overall sound in this case, in particular, also comprises a proportion of direct sound which enters the auditory canal through the ventilation channel 30, in addition to the output sound 20. This might sometimes lead to a deterioration of the sound quality or of the spatial auditory sensation due to the application of the subalgorithm 32 to the signal components 26*a-z* of the first input signal 14, even though in certain cases the subalgorithm 32 is applied only as a result of those signal components 26*a-z* whose contributions cannot be heard at all in the output sound 20.

In order to prevent this, a relevant subset 25 of frequency bands 24*b-x*, which contribute in a relevant extent to the output sound 20, is determined from the frequency bands 24*a-z* of the aforementioned multiplicity 23. This may for example, be done statistically with the aid of an adjustment formula of the hearing aid 10, which provides an inference about the target gain values which are preferentially to be achieved for particular frequency band-based input levels, and which to this extent also delivers information about those of the frequency bands 24*a-z* which in principle will impart no significant contribution to the output sound 20 as a result of the adjustment.

In particular, with the aid of the adjustment formula, basic gain values for respective level values in the frequency band in question may also be specified on a frequency band basis, so that the aforementioned relevant subset 25 (of the "relevant frequency bands" for the output sound 20) may be ascertained with knowledge of such basic gain values with the aid of the signal components 26*a-z* (for example from their respective signal levels) in the individual frequency bands 24*a-z*. Furthermore, a user input (not represented) may also modify the gain factors Ga-Gz frequency-selectively or in a broadband fashion, so that in a specific situation (that is to say for a given set of signal components 26*a-z*) this user input entails a modification of the signal levels and therefore of the respective contributions to the output sound 20 (in comparison with the state before the user input).

One efficient way of taking all this into account and ascertaining the relevant subset 25 of the "relevant frequency bands" is to monitor the total signal amplification along a signal path from the first microphone 3 (optionally including its input characteristic curve and preamplification) as far as the loudspeaker 7 (optionally including its output characteristic curve) for each frequency band 24*a-z*, and thereby to determine a gain value Ga'-Gz' in each frequency band, which thus reflects the total signal amplification along the described signal path. The gain value Ga'-Gz' in this case comprises the respective gain factor Ga-Gz from the subalgorithm 32 and optionally also further gain factors of other subalgorithms (not represented) of the signal processing 28 (and optionally the aforementioned characteristic curves). Preferentially, temporal smoothing of the (instantaneous) gain factors Ga-Gz (and optionally further gain factors from other subalgorithms) is carried out in this case for the formation of the gain values Ga'-Gz', in order to avoid a dependency of the "relevant frequency bands" (that is to say the relevant subset 25) on level peaks.

The gain values Ga'-Gz', which are influenced to the extent described by the adjustment formula and optionally a user input, and further by the signal components 26*a-z* existing at the moment in question, are then compared with a first limit value 36. If the first limit value 36 is exceeded by the respective gain value Ga'-Gz', the associated frequency band 24*a-z* is assigned to the relevant subset 25, otherwise it is not. The first limit value 36 is in this case preferentially to be selected so that a signal amplification with the corresponding gain value leads to a contribution in the output signal that lies above a desired threshold, which is preferentially dependent on the ambient sound and/or on the direct sound arriving at the eardrum.

In the present case, the frequency bands 24*c*-24*x* are ascertained as the relevant subset 25, i.e. the frequency bands 24*a-b* and 24*y-z* make no relevant contribution to the output sound 20 (in relation to the ambient sound, or the direct sound at the eardrum).

By using the frequency bands 24*c*-24*x* of the relevant set 25, a characteristic quantity 38 which provides inference about a noise component (particularly in the aforementioned frequency bands 24*c*-24*x*, or in their entirety) is then ascertained for the activation criterion 34 from the respective signal components 26*c*-26*x*. The characteristic quantity 38 is in this case given by the broadband SNR 40 in the aforementioned frequency bands 24*c*-24*x*.

The SNR 40 is subsequently compared with a noise limit value 42, and if the aforementioned noise limit value 42 is exceeded by the SNR 40, it is inferred that the noise component in the relevant frequency bands 24*c*-24*x* is so high that the advantages of the subalgorithm 32 in respect of improving the SNR 40 now outweigh its disadvantages for the sound quality (for example in respect of artefacts), and activation of the subalgorithm 32 is therefore justified. The subalgorithm 32 is therefore applied to the signal components 26*a*-26*z* (that is to say at least potentially also to the signal components 26*a-b*, 26*y-z* of the frequency bands 24*a-b*, 24*y-z* that are not part of the relevant subset 25).

The processed signal components 29*a*-29*z*, which result from the signal processing 28 that also comprises the subalgorithm 32 due to the described activation, are then combined at the synthesis filter bank 30 to form the output signal 18.

In particular, the subalgorithm 32 that is activated by the described activation 34 may also be applied to the second input signal 16, and therefore be configured for example as directional microphony. In particular, the activation criterion 34 may also employ signal components of the second input signal 16 (in each case not represented).

Although the invention has been illustrated and described in detail by the preferred exemplary embodiment, the invention is not restricted to the examples disclosed and other variations may be derived therefrom by a person skilled in the art without departing from the protective scope of the invention.

The following is a summary list of reference numerals and the corresponding structure used in the above description of the invention.

List of Reference Signs

1 hearing instrument
2 first input transducer
3 first microphone
4 second input transducer
5 second microphone
6 output transducer
7 loudspeaker
8 signal processing device
9 signal processor
10 hearing aid
11 housing
12 ambient sound
13 ventilation channel
14 first input signal
16 second input signal
18 output signal
20 output sound
22 first analysis filter bank
23 multiplicity (of frequency bands)
24*a-z* frequency bands
25 relevant subset (of the multiplicity of frequency bands)
26*a-z* signal components
27 analysis
28 signal processing
29*a-z* processed signal components
30 first synthesis filter bank
32 subalgorithm
34 activation criterion
36 first limit value
38 characteristic quantity
40 SNR
42 noise limit value
Ga-Gz gain factor
Ga'-Gz' gain value

The invention claimed is:

1. A method for operating a hearing instrument having at least one acousto-electric first input transducer and an electro-acoustic output transducer, which comprises the steps of:
- generating a first input signal via the at least one acousto-electric first input transducer from an ambient sound;
- breaking down the first input signal and/or a first intermediate signal derived from the first input signal into a plurality of frequency bands;
- generating an output signal from the first input signal, or from the first intermediate signal, by means of frequency-selective signal processing;
- determining a relevant subset of frequency bands from the plurality of frequency bands such that, in each of the frequency bands of the relevant subset, an output sound generated from the output signal by the electro-acoustic output transducer makes a contribution that lies above a defined or desired threshold;
- verifying an activation criterion for activation of a sub-algorithm for the frequency-selective signal processing only in the frequency bands of the relevant subset with an aid of signal components of the first input signal, or of the first intermediate signal; and
- applying the subalgorithm to the first input signal, or to the first intermediate signal, in dependence on the activation criterion.

2. The method according to claim 1, wherein in order to determine the relevant subset, an adjustment formula for frequency band-based adjustment of the hearing instrument is used.

3. The method according to claim 1, wherein in order to determine the relevant subset on a frequency band basis, a gain value of signal contributions of the first input signal, or of the first intermediate signal, in a respective one of the frequency bands is used.

4. The method according to claim 3, wherein in order to determine the gain value on the frequency band basis, the first input signal is compared with the output signal and/or a signal amplification applied along a signal path from the at least one acousto-electric first input transducer to the electro-acoustic output transducer is monitored, and wherein the gain value is compared with a first limit value dependent on the predefined or desired threshold.

5. The method according to claim 1, wherein in order to determine the relevant subset, a setting of a signal amplification performed by a user of the hearing instrument is taken into account.

6. The method according to claim 1, wherein in order to verify the activation criterion, a characteristic quantity which provides inference about a noise component in the frequency bands is ascertained from the signal components of the first input signal, or of the first intermediate signal, in the plurality frequency bands of the relevant subset.

7. The method according to claim 6, which further comprises ascertaining a signal-to-noise ratio of the signal components in the frequency bands of the relevant subset as the characteristic quantity.

8. The method according to claim 6, wherein the characteristic quantity is compared with a noise limit value which corresponds to an upper limit for a permissible noise component, and wherein the activation criterion for the activation of the subalgorithm is considered to be satisfied if the noise limit value is exceeded.

9. The method according to claim 1, wherein a second input signal is generated by an acousto-electric second input transducer of the hearing instrument from the ambient sound, wherein the output signal is additionally generated from the frequency-selective signal processing of the second input signal, and wherein the subalgorithm contains directional microphony of the first input signal, or of the first intermediate signal, and of the second input signal and/or of a second intermediate signal derived from the second input signal.

10. The method according to claim 9, wherein the activation criteria is verified with an aid of signal components of the second input signal, or of the second intermediate signal, only in the frequency bands of the relevant subset.

11. The method according to claim 1, wherein the subalgorithm comprises:

frequency band-based amplification; and/or
frequency band-based compression; and/or
noise suppression.

12. A hearing instrument, comprising:

at least one acousto-electric first input transducer;
an electro-acoustic output transducer; and
a signal processor, wherein the hearing instrument is adapted to carry out the method according to claim 1.

* * * * *